United States Patent [19]
Clarke et al.

[11] 3,715,068
[45] Feb. 6, 1973

[54] APPARATUS FOR THE LAYING OR RECOVERY OF CABLES

[75] Inventors: Eric Fifield Stuart Clarke, Harrow; James Edwin Henry Cosier, Northolt; Jan Kolanowski, London; Peter Seaton Halls, St. Albans; Alexander Duncan Lindley Laidlaw, Harrow, all of England

[73] Assignee: The Post Office, London, England

[22] Filed: Aug. 28, 1970

[21] Appl. No.: 67,941

[52] U.S. Cl. ............... 226/108, 226/187, 226/188
[51] Int. Cl. ........................................... B65h 12/22
[58] Field of Search ............ 226/187, 188, 177, 108; 61/72.3; 188/72.5

[56] References Cited

UNITED STATES PATENTS

| | | | |
|---|---|---|---|
| 3,589,580 | 6/1971 | Smulders | 226/187 X |
| 3,506,174 | 4/1970 | Shuey | 226/187 X |
| 3,372,461 | 3/1970 | Tesson | 61/72.3 X |
| 2,973,837 | 3/1961 | Wilson | 188/72.5 X |

Primary Examiner—Allen N. Knowles
Assistant Examiner—Gene A. Church
Attorney—Hall & Houghton

[57] ABSTRACT

A cable engine for the laying or recovery of submarine cables includes hydraulically powered traction wheels fitted with pneumatic tires to apply traction to a cable. The traction wheels are arranged in pairs, each pair contacting the cable at opposite ends of a diameter, and are resiliently mounted to enable a repeater to pass through the engine without damage. Resiliently mounted guide rollers may be employed in addition to the traction wheels. A shipboard mounting for the engine is shown and includes a load cell arrangement to enable cable tension to be monitored. A hydraulic control system for use in both laying and recovering operations is described.

13 Claims, 17 Drawing Figures

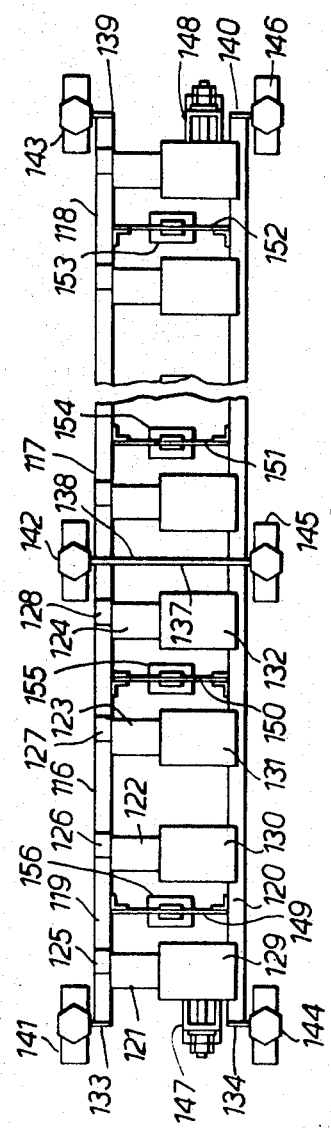
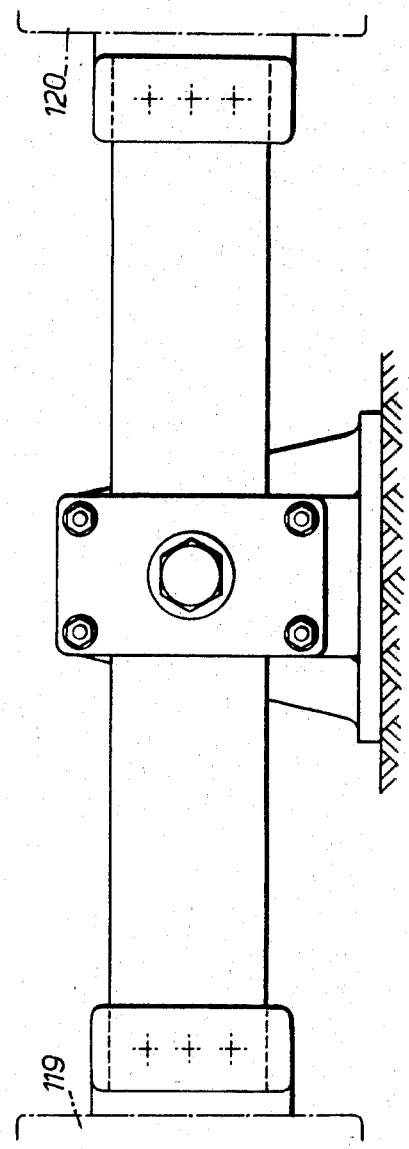
FIG. 9.
FIG. 10.

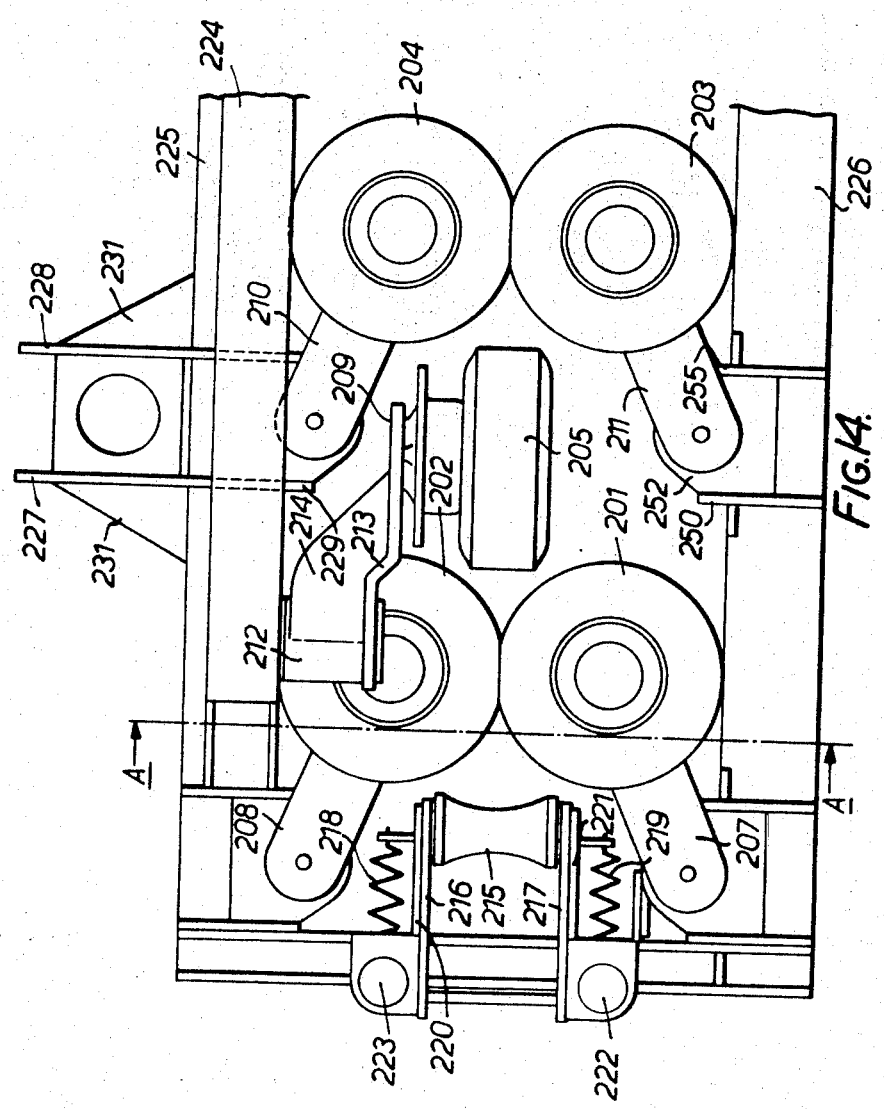

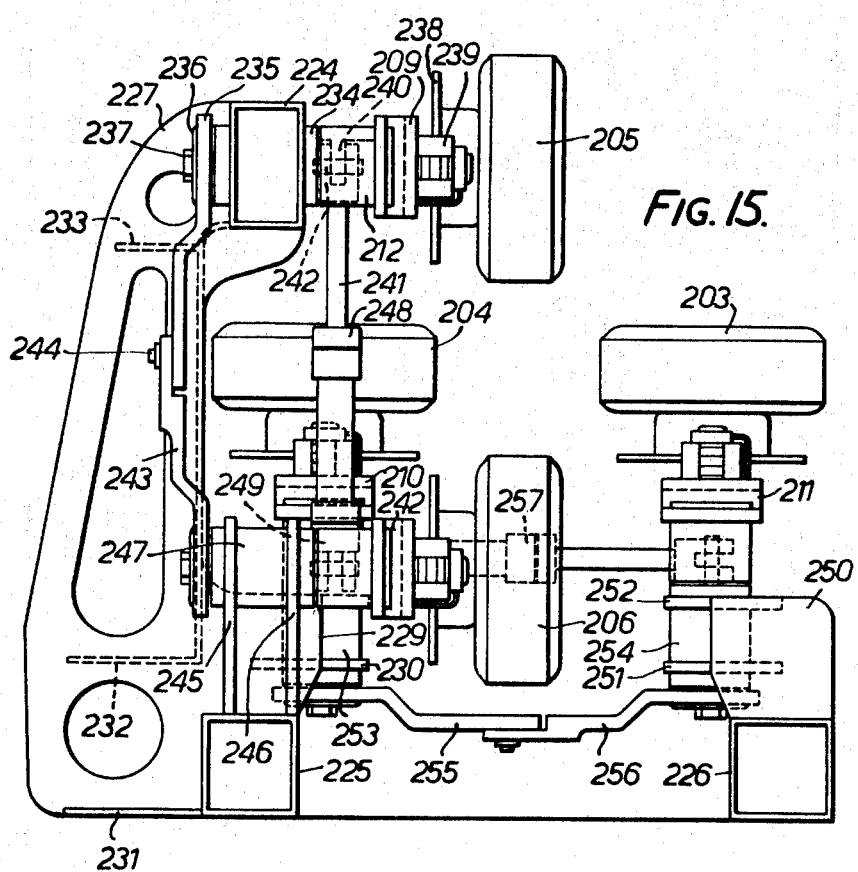
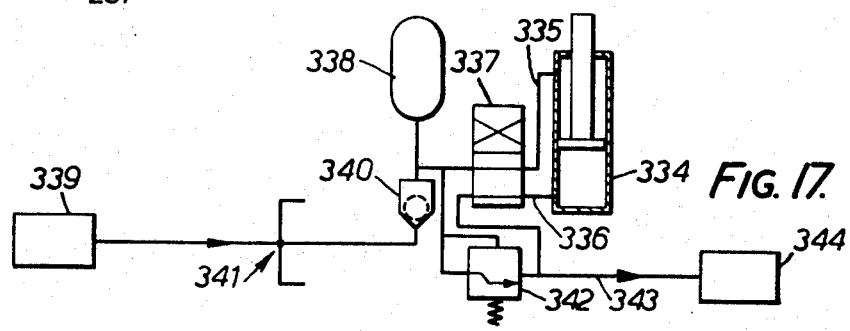

APPARATUS FOR THE LAYING OR RECOVERY OF CABLES

This invention relates to apparatus for the laying or recovery of cables, particularly submarine cables incorporating joints or repeaters. Such apparatus is frequently referred to as a "cable engine" and this term will be used here.

In the laying of repeatered or jointed cables, difficulties arise if the repeater or joint housing is rigid and has an outer diameter considerably greater than that of the cable itself. Known methods of overcoming these difficulties, for example by forming the cable with a "bight" including a repeater or joint, bridging the bight by a hawser and arranging for the repeater to be conveyed by a trolley or the like alongside a set of cable transporting sheaves, are not entirely satisfactory since these have employed means which involve multiple reverse bending of the cable over and under consecutive transporting sheaves of the cable engine, which is undesirable particularly when the cable being laid is of relatively large diameter. Also modern communication systems often operate at very high frequency, which involves the provision of many repeaters with relatively close spacing in a given cable length, with the result that, with the known Cable Engines, the cable laying operation tends to become cumbersome and slow involving frequent slowing down of the cable ship as each repeater comes to be dealt with and which particularly in deep seas, always entails the risk that the stress changes applied to the cable may cause damage to the cable or the repeater equipment.

It is an object of the invention to provide an improved apparatus for the laying or recovery of cables which substantially overcomes the above difficulties.

According to the invention, there is provided an apparatus for the laying or recovery of cables, the apparatus including:

a first plurality of pairs of guide means, and a second plurality of pairs of guide means said pairs of guide means being mounted in tandem fashion on mounting means and co-operating to define a cable path, wherein:

the first plurality of pairs of guide means comprises pairs of traction wheels fitted with pneumatic tires, means are provided to operate the traction wheels to apply traction to a cable, individual means for each pair of traction wheels are provided to resiliently bias the wheels of the pair into contact with the cable at opposite ends of a diameter thereof and to constrain said wheels for substantially symmetrical movement about the cable path, and individual means for each pair of guide means of said second plurality of guide means are provided to resiliently bias the guide means of the pair inwardly towards the cable path and to constrain said guide means for substantially symmetrical movement about the cable path.

One embodiment of the invention comprises a cable engine having guide means comprising groups of guide rollers and rollers for applying traction comprising groups of traction wheels arranged in tandem. The traction wheels are hydraulically powered, fitted with pneumatic tires and are arranged in pairs so that the wheels of a pair shall contact the periphery of the cable at opposite ends of a vertical diameter. Preferably each traction wheel is provided with a respective disc brake. The guide rollers are similarly arranged but with their axes at right-angles to the traction wheels' axes. Guide rollers are positioned at the entrance and exit of the apparatus and a number of pairs of traction wheels are provided, two pairs of guide rollers being positioned between consecutive pairs of traction wheels. The rollers and wheels are mounted on a common base plate.

When a repeatered or jointed cable is being conveyed by the engine, the onset of the leading end contour of a repeater or joint housing causes the pair of guide rollers first in line of movement of the cable to be displaced laterally to enable the rollers to engage the surface of the repeater or joint housing to position the repeater centrally with respect to the traction wheels, then, as the repeater or joint advances, the leading end contour engages the traction wheels, displacing these vertically so that the driving or braking action of these wheels is transferred from the cable to the surface of the advancing repeater or joint housing; similarly the guide rollers following the traction wheels are displaced when they encounter the leading end contour of the advancing repeater or joint housing to further stabilize and centralize the repeater or joint in its passage through the cable engine. As the trailing end contour of the repeater or joint housing passes through the guide rollers and traction wheels, these automatically return to their original positions corresponding to the diameter of the cable being conveyed.

To provide for their vertical movement the traction wheels are mounted upon radius arms, pivotally secured to an upright member of the base frame and to ensure symmetrical movement of the two wheels of a pair with respect to the cable path axis, the radius arms are in the form of bell crank levers, pivoted at their apices with their free ends mechanically coupled. To cause the traction wheels to exert a frictional bearing pressure upon the cable being conveyed, the lever arms carrying the traction wheels are coupled to hydraulic ram means arranged to exert a pull upon lever arms so as to urge the traction wheels carried thereby inwards towards the cable path axis. The hydraulic ram means may be of any suitable type, but is preferably provided with a pre-settable pressure relief valve, whereby the bearing pressure of the traction wheels upon the cable sheath can be set to a desired value while allowing the arms to be displaced outwardly when the traction wheels engage the end contour of a repeater housing.

To provide for the guide rollers' lateral movement, these rollers are mounted upon pivotal lever members, with the free ends of the levers, associated with a pair of guide rollers, linked together by quadrant gearing so that the guide rollers also move symmetrically with respect to the cable path axis. Further, the levers are provided with spring means to mechanically urge the rollers inwards towards the cable path axis and thereby to provide a suitable positioning force on the cable being conveyed to maintain its position central with regard to the peripheries of the associated pair of transporting wheels, while allowing the rollers to be displaced outwardly when the end contour of a repeater or joint housing is encountered.

A second embodiment of the invention is generally similar to the first embodiment but the guide roller assemblies of the first embodiment are replaced by further pairs of traction wheels disposed horizontally.

In order that the invention may be fully understood and readily carried into effect two exemplary embodiments will now be described with reference to the accompanying drawings of which:

FIG. 1 shows a perspective view of a cable engine embodying the invention,

FIGS. 2 to 4 show details of the cable engine of FIG. 1, FIG. 3 being a cross-section along the line III—III of FIG. 2 with certain parts of the engine omitted for clarity, FIGS. 5 and 6 show respectively plan and elevation views of a modified guide roller assembly for use in the cable engine of FIGS. 1 to 4, FIGS. 7 and 8 show respectively an outline drawing of a traction wheel assembly incorporating a disc brake, and a part sectional drawing showing the construction of a traction wheel hub and brake disc, FIGS. 9–13 inclusive show details of a chassis layout and mounting arrangements for a multi-modular cable engine as shown in the preceding Figures, FIG. 14 shows, in outline form only, a plan view of a second cable engine embodying the invention, FIG. 15 shows in more detail a sectional view taken on the line A—A of FIG. 14, FIGS. 16 and 17 show in schematic form details of an hydraulic system applicable to both the first and second embodiments.

It is to be noted that minor details of construction, such as nuts and bolts, have generally been omitted from the drawings and that the presence of a cable is shown only in FIG. 1.

The description will refer to a first embodiment of the invention followed by details of various possible modifications. A detailed description of a mounting arrangement for the first embodiment and a description of a second embodiment of the invention then follow. Finally, a detailed hydraulic system applicable to both embodiments is described.

FIG. 1 shows a general view of a first cable engine embodying the invention conveying a cable 8. The engine is constructed on a rectangular base frame 1 and comprises four repeated traction wheel and guide roller arrangements together with end elements 9, 10. It is only necessary to describe one of the traction wheel and guide roller arrangements in detail as the remaining three are exactly similar.

Each traction wheel and guide roller arrangement comprises one pair of cable traction wheels 2, 3 and two pairs of guide rollers 4, 5 and 6, 7. The cable traction wheels are located between the two pairs of guide rollers, the cable traction wheels having their axes horizontally disposed, at right angles to and on opposite sides of, the axis of the cable 8, and the guide rollers of each pair having their axes disposed vertically, at right angles to and on opposite sides of the axis of the cable 8.

Referring to FIGS. 1, 2 and 3, the arrangement of the traction wheels and their control mechanism will first be described. Each of the traction wheels 2, 3 is bolted to a respective hub-member keyed to the rotor shaft of a hydraulic motor 12 (FIG. 1) capable of providing either a forward or reverse driving action, or capable of acting as a pump when driven by the cable and thereby providing a required braking action. Each of the traction wheels is also provided with a pneumatic tire 13, which in use of the cable engine, resiliently engages the cable 8 or repeater housing (not shown) thereby minimizing the risk of damage to the cable or repeater apparatus being conveyed. The hydraulic motors 12 are secured to mounting plates 14 (see FIG. 1) formed integral with the horizontal arms 15, 16 (FIG. 2) of respective bell crank lever members 17 and 18. Each of these bell crank levers is pivoted at its apex upon respective pivot pins 19, 20 (FIG. 3) spaced along a mounting pillar 21. The mounting pillars 21 are of hollow rectangular box formation. They are secured to the base frame 1 by a welded construction incorporating webs 22, and are also linked to one another by supporting struts 38 which extend horizontally between adjacent mounting pillars and are secured thereto by a welded web construction approximately mid-way along the length of the mounting pillars. Vertical arms 23, 24 of the bell crank levers 17, 18 are arranged to overlap one another over part of their lengths and are pivotally coupled together by a sliding block pivot 25.

FIG. 3 of the drawings illustrates, in part section, a fragment of the mounting pillar 21, and illustrates the detail construction of the apex pivots of the two bell crank levers and of the vertical arm sliding block pivot. As will be seen, the apex pivots comprise pivot pins 19, 20 located in the mounting pillar by hub members 26 which extend across the hollow interior of the pillar and protrude beyond the rear face thereof. These hub members are secured by being welded to the front face of the mounting pillar. Each pivot pin has a portion of reduced diameter which protrudes beyond the rear of the hub 26 and which has welded thereto an annular anchor plate 27 which is secured, through a supporting ring 28 welded to the rear face of the mounting pillar, by bolts 29. A hub 30 is welded into an aperture near the apex of each bell crank lever. The hub is provided with a bushing 31 so that the bell crank levers are free to pivot on the pivot pins 19, 20. An end cap 32 is secured to the front end of each pivot pin and serves to retain the bell crank levers in place.

To enable the vertical arms of the bell crank levers to overlap one another, the upwardly projecting lever arm 24 has a cranked form to enable its front surface to face the rear surface of the depending lever arm 23, the crank back being formed by welding an extension part 33 to the rear of the arm 24 which is initially made shorter than the arm 23. The extension part 33 has an elongated rectangular aperture 34 formed in it, and within the depth of this aperture a rectangular phosphor bronze bearing block 25 is located, the width of the bearing block being a sliding fit in the rectangular aperture and its length being somewhat less than the length of the aperture so that the bearing block has a limited freedom of longitudinal movement within the aperture. The bearing block is retained within the aperture by retaining plates 35 as shown on the drawing. A pivot pin 36 is secured at the corresponding point in the lever arm 23 and passes through the sliding block 25, the assembly being retained by a thrust washer and pin, as shown.

The above described method of pivotally connecting the vertical arms 23, 24, together, ensures that the traction wheels of a pair move substantially symmetrically with respect to the cable axis when the traction wheels encounter a repeater or joint housing or the like incorporated in the length of the cable being conveyed, and the sliding block pivot accommodates the angular movement of the arms 23, 24 to the limited extent required for the differences between cable and repeater or joint housing diameters, envisaged. It will be appreciated that the same end could have been achieved by forming the lever arms 23, 24 with interengaging toothed quadrants at their extremities, but this results in a more expensive construction which is unnecessary where the angular movement of the levers is relatively small.

Referring again to FIG. 2, to ensure that the traction wheels of a pair maintain a constant, predetermined bearing pressure upon the cable or repeater housing being transported at any time, the horizontal arms 15 and 16 are coupled together by a double acting hydraulic ram 37 which has its connecting rod 39 pivotally secured to a web fabricated on the rear face of the lever arm 15, as shown in broken outline in FIG. 2. The lever arm 16 is similarly connected to the end clevis of the cylinder of the hydraulic ram, which in operation under applied hydraulic pressure causes the two ends of the hydraulic rams to move towards one another. Such hydraulic rams are well known and may be fitted with pressure relief valve means (not shown) which can be preset to cause the ram to exert a constant predetermined pull on the lever arm 15, irrespective of movement of the levers towards or away from the cable path axis.

Referring now to FIGS. 1, 2 and 4, the arrangement of the guide rollers and their control mechanism will now be described. The cable guide rollers are mounted in pairs upon pedestals 40. These pedestals are of box-like construction, the longer sides of which extend beyond the end faces, to form recesses for the location of control springs as described below.

The pedestals 40 are mounted across the base frame 1 and are located one at each end of the cable engine module and also intermediate of each pair of traction wheels, as clearly shown in FIG. 1. Each intermediate pedestal carries two pairs of guide rollers, each pair positioned closely to associated traction wheels. Each terminating pedestal carries only one pair of guide rollers. The end pedestals are provided with sloping glide path members 41 (FIG. 1). Each of the pedestals also accommodates a drag roller 42 supported transversely of the cable path axis in pedestal bearings 43. These provide a roller surface for the cable or repeater housing should the cable slacken back and sag for any reason during a cable laying operation The arrangement of the guide roller mechanism shown in FIGS. 2 and 4 enables the guide rollers to maintain a substantially constant inward guiding pressure upon the cable or associated apparatus housing being conveyed by the cable engine module at any time, and serve to ensure that the guide rollers maintain the cable or associated apparatus central with regard to the width of the cable traction wheels.

Like the traction wheels, the guide rollers are carried by pivoted bell crank levers 44, 45, 46, 47 (FIG. 4). The rollers 4, 5, 6, 7 are formed of nylon and are free to rotate upon spindles (not shown) secured in vertical hubs such as 48, 49 (FIG. 2) by pinch bolts 50, 51. The hubs 48, 49 are welded to their respective lever arms and further secured by the welded web construction shown at 52, 53. The upper end of each spindle has a portion of reduced diameter on to which an end cap 56 is welded and which serves to retain the roller in position. As will be seen from FIG. 2, the bell crank levers on the right-hand side of the pedestal, as viewed in FIG. 2, are vertically spaced by a suitable spacer 57 so that their free arms overlie as shown in FIG. 4.

The outward movement of the bell crank levers 44, 45, 46, 47 is limited by the engagement of rubber stop members such as 74 and 75 shown in FIG. 2. These are bolted to the lever arms by bolts 54 and 55 (FIG. 2). As also shown in FIG. 2 the right-hand stop member is suitably spaced from its associated lever arm by a spacer 73 which is welded on to the under face of the right-hand lever arm which, as previously explained is elevated with respect to the left-hand lever arm as seen in FIG. 2. These rubber stop members limit the outward displacement of the guide rollers by engaging the side facing edge of the upper pedestal mounting plate.

Inward movement of the bell crank levers is limited by an edge of the free limb of each bell crank lever contacting the boss at the apex of the opposite bell crank lever, as clearly shown in FIG. 4.

The bell crank levers 44, 45, 46, 47 (FIG. 4) are pivoted at their apices by pivot pins which are integral with the bell crank levers. These pivot pins depend through bushings 61, 62 (FIG. 2) in the pedestal mounting plate and engage torsion spring carrying cylinders such as 63, 64 (FIG. 2), the engagement being effected by a key and keyway, formed at the upper end of the cylinder and the lower end of the pivot pin respectively. The lower ends of the torsion spring carrying cylinders are located over dowel pins (not shown) which are secured to and project upwards from, the lower pedestal mounting plate. Torsion springs are secured at the upper end of the torsion spring carrying cylinders by the turned over flange of washer members 65 and 66 (FIG. 2) while the lower end of each spring extends alongside a tension adjusting plate 67 (FIG. 2) which is engaged by a pre-tensioning set screw 68, by means of which the torsion springs are pre-set to exert a required torque to cause the bell crank levers to urge their associated guide rollers inwardly towards the cable path axis. Symmetrical movements of the guide rollers with respect to the cable path axis is ensured by forming the free ends 57, 58, 59, 60 (FIG. 4) of the bell crank levers with quadrant gear teeth, the quadrant gears of associated pairs of guide rollers being arranged to intermesh.

The hydraulic arrangements provided for the actuation of the hydraulic motors and the pressure controlling rams to some extent depend upon the use to which the cable engine is to be put. Thus the motors may be supplied in parallel from a suitable source of hydraulic power such as a master pump over main flow and return pipes with change-over means to reverse the direction of flow to the motors when required to change from paying out to reeling in. The hydraulic rams are preferably supplied from a separate pump and each ram provided with a separate accumulator. This arrangement ensures that if the hydraulic supply fails the grip is maintained. However, to meet conditions such as those encountered during the laying or recovery of cables from a ship at sea where the motion of the ship may vary considerably, it is contemplated that more complex hydraulic arrangements for the control of the hydraulic motors may be provided. For example by providing pressure and flow sensing and controlling means to control the hydraulic pressures and flows at the outlet of the main driving pump and at the inlet and/or outlet to the various driving motors and thus control the laying tension. Means may also be provided for laying at a predetermined speed independent of laying tension. It is visualized that such a control arrangement would greatly facilitate the laying of repeatered cables at sea since it would tend to ensure the maintenance of a substantially constant cable tension under adverse conditions and thereby minimize the risk of the cable being damaged.

After a second embodiment of the invention has been described, a detailed example of an hydraulic system will be given.

Some possible modifications (the use of which is preferred) of the first embodiment will now be described.

Referring to FIGS. 5 and 6, the general construction of a roller assembly there shown is similar to that described with reference to FIG. 4 and corresponding parts are given the same designations as in FIG. 4. The assembly is modified to incorporate skid members 77 and 78 which have flared ends and which serve to assist the displacement of the guide roller by irregularly shaped cable hauling accessories such as shackles, swivels and the like which may have to pass through the cable engine during laying or recovery operations. In FIG. 5, the intermeshing quadrant gear mechanism shown in FIG. 4 is protected by a cover plate 76. The skid members 77 and 78 are aluminum-bronze castings. Each skid extends over a pair of rollers located one on either side of the cable path axis and is formed with an inwardly facing skirt part 83 (FIG. 6) and rib members such as 84, 85 and 86. The horizontal rib members 84, 86 (FIG. 6) are also formed with bosses 87, 88, 89, 90 which are bushed to accommodate spindles (not shown) on which the cable guide rollers 91, 92, 93, 94 are rotatable and the inwardly facing skirt parts are formed with apertures adjacent the bosses through which a sector of the associated guide roller projects through the plane of the inwardly facing skirt parts and are thus effective in engaging a cable or repeater in the manner previously described. Since the centers of the rollers on the same side of the cable path are now fixed, relative to one another, and to permit the gating action of opposing pairs of rollers as previously described, the spindles on which the rollers 93 and 94 rotate are carried by crank members, such as the crank member 95 (FIG. 6), in the free end of which the roller spindle is a shrink fit, the "big" end of the crank being bushed to rotate about a second spindle which is carried by the boss 48. The spindles on which the rollers 91 and 92 rotate are secured in the bosses such as boss 49 (FIG. 6) and project through spacers such as 96 (FIG. 6). The roller and skid assembly is finally secured by cap bolts 97, 98, 99, 100. With the skid assembly described above, it will be appreciated that any irregularly shaped object such as a shackle, swivel or the like, which is moving, say, from left to right of the drawing, FIG. 5, will first engage the flared end parts 80, 81 of the skids, causing the rollers 91, 92 to be outwardly displaced in the manner previously described with reference to FIG. 4 of the drawings. As the object advances between the rollers, the rollers 93, 94 are also displaced outwardly, the radial movement of the bell crank levers 46, 47 being accommodated by the crank members such as the crank 95 (FIG. 6), and as the object advances to the right, clear of the rollers 93, 94, the rollers restore under the action of the restoring springs associated with the bell crank levers 44, 45, 46 and 47 as described with reference to FIG. 2 of the drawings.

Turning now to FIGS. 7 and 8, these show a traction wheel assembly which is modified to incorporate a disc brake 101 (FIG. 7) which operates upon a disc 102. The disc brake mechanism is of conventional form which may be purchased as a proprietory component, and is not described in detail, it being sufficient to say that the mechanism is of the reverse acting hydraulically operated type so that so long as the oil pressure in the traction wheel oil circulation system is maintained, the disc brake is maintained in its OFF condition and plays no part in the operation of the cable engine. The disc brake thus serves as a safety device which will operate to retard or arrest the rotation of the associated traction wheel for example in an emergency should the oil pressure in the hydraulic system fail for any reason, or when it is required to stop the cable laying or recovery operation and to hold the cable stationary. The caliper element of the disc brake is bolted to the horizontal arm 15 of the associated bell crank lever by bolts not shown. FIG. 7 is an outline drawing showing, in plan, a view of the upright member 21, the horizontal arm 15 of the bell crank lever 17 (FIG. 2) and the traction wheel 13. It is proposed to equip all the traction wheels of a cable engine with disc brakes as above described. FIG. 8 shows in greater detail a preferred construction of traction wheel assembly with its associated brake disc 102 and hydraulic motor 103. The traction wheel 13 comprises a solid hub part 104 which is secured to the motor shaft 105 via a taper lock bush 107 which is keyed to the motor shaft by a key located in the key way 106. Two wheel rim parts 108 and 109 are formed as shown with annular flanges which locate in an annular recess 112 formed in the hub 104 and are secured thereto by nuts such as 110 threaded on to studs 111, the latter being screwed into the hub 104 and secured by spot welding the rear faces of the studs to the hub. Five studs such as 111 and nuts such as 110 are provided and are equidistantly spaced around the wheel rim.

The brake disc 102 is a cast steel component which comprises a disc part 113, a bowl shaped part 114 which partially shrouds the motor 103, and a flange part 115, the flange part 115 being located in a second annular recess 413 formed in the hub 104, and secured by five countersunk head screws (not shown) which are spaced around the flange part in interleaved relationship to the studs 111. In FIG. 8, the brake caliper mechanism is not shown, being behind the driving motor, but like the motor, this component is bolted to the horizontal arm 15 of the associated bell crank lever, suitable shims being used to achieve correct alignment of the caliper with the brake disc. For simplicity, the oil supply and return pipes for the motor and disc brake caliper are omitted from FIG. 8, but these may suitably take the form of flexible hose pipes secured to the oil ports provided in the end cover 116 of the motor and in the disc brake caliper assembly (not shown).

There now follows a description of a mounting arrangement for the first embodiment which is a preferred alternative to the mounting arrangement shown in FIG. 1.

FIGS. 9–13 illustrate cable ship mounting arrangements which enable an indication of the tension to which a submarine cable is being subjected to be continuously indicated during the laying or recovery of a submarine cable.

FIG. 9 illustrates in outline, a plan view of the mounting arrangements.

Figure 2:
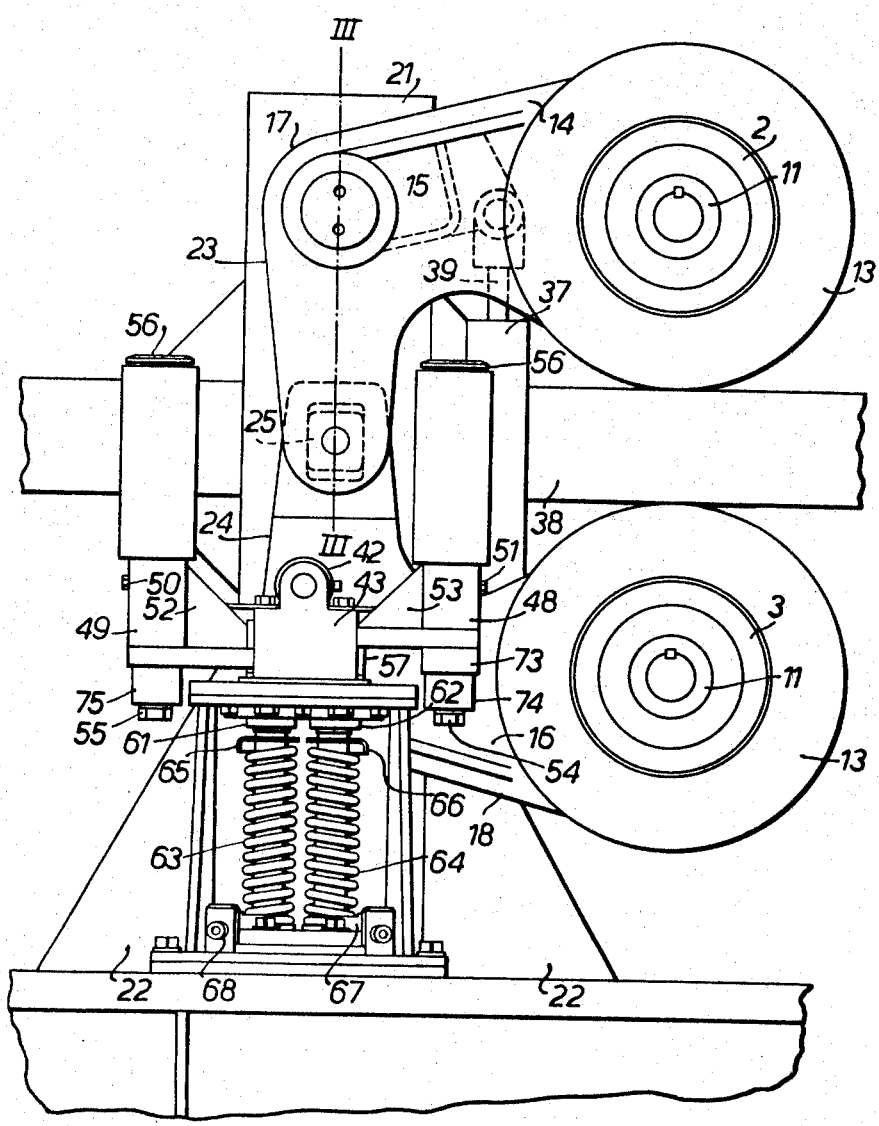

References 116, 117, 118 indicate first, second and fourth module mounting chassis arranged in tandem (the third module chassis not being shown). Module chassis 116 comprises two frame members 119 and 120 which extend lengthwise of the module and four bridging members 121, 122, 123 and 124. These members are of rectangular hollow steel section secured together by welding and strengthened by corner webs (not shown). Mounting pillars, also of rectangular hollow section, and which carry respective pairs of traction wheels, as shown in FIG. 2 of the drawings are similarly secured to the chassis members 119, at 125, 126, 127 and 128. Mounting plates 129, 130, 131 and 132 are provided for respective guide roller assemblies. These mounting plates are secured in overlapping relationship to the frame members 120 and the respective bridging members 121–124 and are provided with two sets of bolt holes (not shown) to enable the guide roller assemblies to be mounted in one or other of two positions displaced longitudinally from one another by a short distance for a reason described later, below.

Figure 13:
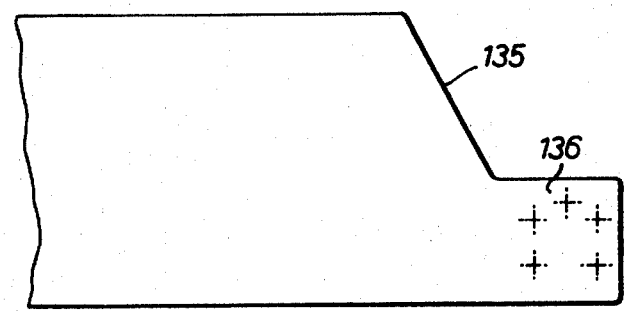

At the left-hand end of the module chassis 116, as viewed in FIG. 9, the frame members 119 and 120 are provided with end plates 133 and 134. These end plates cover the ends of the respective chassis members and also provide laterally projecting lugs of the form shown in FIG. 13, which shows in elevation the laterally projecting part of an end plate and which comprises a downwardly sloping part 135 and a lug part 136, the latter being provided with five bolt holes as shown. The right-hand end of module chassis 116 is provided with a rectangular end plate 137 which extends across the whole width of the module chassis while the left-hand end of module 117 is provided with an end plate 138 which is similar to the end plate 137 but, additionally, provides lugs of the form shown in FIG. 13, which project laterally from each side of the module. The junction between the chassis of module 117 and the chassis of the third of the four modules (not shown) and between the chassis of the third and fourth modules, i.e. module 118 in FIG. 9, is effected in the same manner as described for the junction between the chassis of the modules 116 and 117. The right-hand end of the module chassis 118 is terminated by end plates 139 and 140, of the same form as the end plates 133 and 134. The respective end plates are welded to the associated chassis members and for the assembly of the module chassis together the abutting end plates are bolted together by bolts (not shown).

For the installation of the multi-modular cable engine on board a cable ship, the chassis modules are raised clear of the deck and the projecting lug parts are bolted respectively to the free ends of vertical leaf springs which depend within supporting pedestal members such as the members 141 and 146, FIG. 9. The construction of these pedestal members is described in detail below with reference to FIG. 11 of the drawings. The pedestal members are bolted to the deck structure which may be modified to provide suitable fixing stools as required. With this arrangement the whole cable engine assembly would be free to swing longitudinally under the varying stresses applied to it during the laying or recovery of a submarine cable. However this longitudinal movement is limited by providing stays at each end of the cable engine assembly which effectively tether the assembly against excessive swing, and in the preferred method of installation these stays incorporate load cells as indicated at 147 and 148, FIG. 9, and described in greater detail below with reference to FIG. 12. Also these load cells incorporate strain measuring elements to enable an indication to be provided of the tethering stress applied to each end of the cable engine, and enables this to be pre-set to a specified value.

To counter any tendency of the cable engine to swing laterally due to a rolling motion of the cable ship at sea, horizontally oriented leaf spring tethering members such as 149, 150, 151 and 152 are provided. Each module chassis is provided with two such tethering members as shown on module chassis 116 in FIG. 9, and each tethering member is clamped over a central region of its length to a pedestal member as indicated at 153, 154, 155 and 156, each pedestal being secured to the deck structure in a similar manner to that above described for the supporting pedestals 141–146. The extremities of the spring tethers are bolted to angle brackets which are welded to the inwardly facing sides of the longitudinally extending chassis frame members. The construction and assembly of these horizontal leaf spring members with their associated clamping pedestals will be clear on examination of FIG. 10, without the need for detailed description here. It will be appreciated that the horizontal leaf spring tethering arrangement shown is effective only in preventing lateral swing of the cable engine and does not impede its longitudinal movement. Also, by clamping the leaf spring tethering members to their clamping pedestals after the cable engine has been suspended from the supporting pedestals 141–146 as above described, it is ensured that the horizontal leaf springs do not play any part in supporting the weight of the cable engine assembly.

Figure 11:
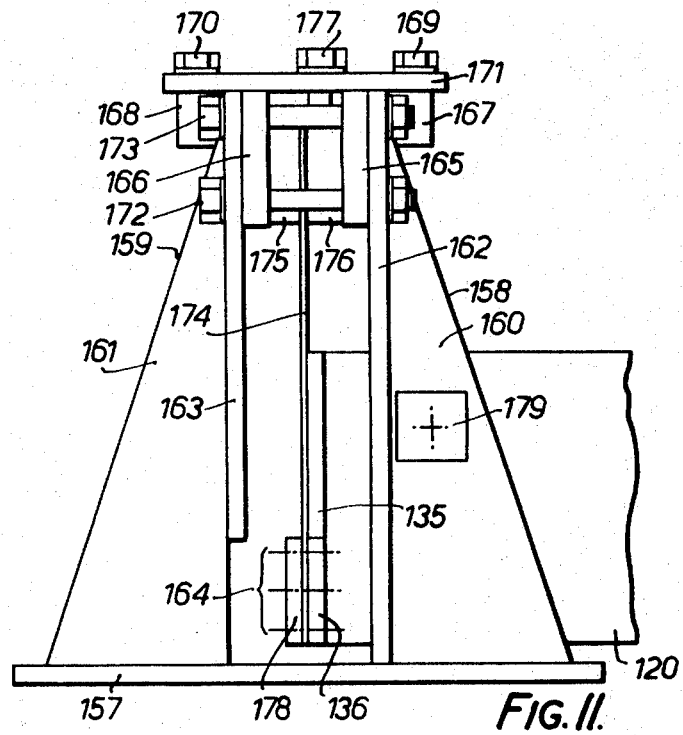

Referring now to FIG. 11, the supporting pedestals indicated at 141–146 (FIG. 9) comprise a base plate 157 to which two vertically extending pedestal frame members 158 and 159 are welded. Each frame member comprises two webs of triangular formation, of which only one for each frame member and respectively designated 160 and 161 is seen in the drawing. These webs are welded to respective ones of laterally extending plates 162 and 163 respectively, the plate 163 being made short as shown to provide access to the bolts indicated at 164. Also welded to the upper ends of these laterally extending plates are spacing blocks 165 and 166, and bosses 167 and 168, the latter being provided with threaded bolt holes to accept bolts 169 and 170, by means of which a cap plate 171 is secured to the upper ends of the frame members 162 and 163. The upper ends of these frame members are also linked together by four clamping bolts of which only two, designated 172 and 173 are seen in the drawing. A flat leaf spring 174 of rectangular form is clamped at one end between clamping blocks 175 and 176 by means of a centrally positioned recessed bolt, not shown, and the clamping block 176 is provided with two threaded bolt holes in its upper face, in positions to accept two adjusting bolts of which only one, designated 177, is seen in the drawing. The outwardly facing sides of the clamping blocks 175 and 176 are each formed with a centrally positioned, vertically extending tenon and these locate in correspondingly located mortices formed in the inwardly facing sides of the spacing blocks 165 and 166, the dimensions being such that with the clamping bolts 172 and 173 slackened off, the sub-assembly comprising the clamping blocks 175, 176 together with the leaf spring 174, is a sliding fit between the spacing blocks 165 and 166, while with the clamping bolts 172 and 173, and the corresponding pair not seen in the drawing, the upper ends of the members 162 and 163 can be distorted inwardly far enough to firmly clamp the leaf spring sub-assembly in any set position. At their free ends, the leaf spring members are clamped between a clamping plate 178 and a lug 136, which as described above with reference to FIGS. 9 and 13 projects from the chassis framework into association with the respective supporting pedestal. By this means the cable engine assembly is suspended by the leaf spring members 174 provided in each of the supporting pedestals such as 141–146 (FIG. 9) associated with the overall cable engine assembly. Also, resistance type strain gauge elements (not shown) are cemented along an intermediate portion of the length of the leaf springs 174 to enable an indication to be provided of the loading applied to the associated leaf spring by the cable engine assembly whereby by adjustment of the adjusting bolts 177 at each pedestal, the weight of the cable engine assembly can be distributed equally over all the supporting pedestal elements. The pedestal web members 160 are also provided with a reinforced bolt hole 179 to enable the cable engine to be clamped by means of a suitable set bolt to the supporting pedestals when the cable engine is not in use. The pedestals (with the exception of those at the inboard extremity) can be provided with respective stools of graded heights. The heights can progressively increase according to distance from the inboard extremity, whereby the cable engine is given an inclination to the horizontal such that the line of the cable path through the engine during laying or recovery meets the main cable sheave (bow or stem) at a tangent.

Figure 12:
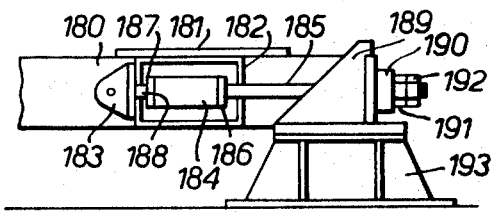

Referring now to FIG. 12, this shows in more detail the load cell tethers described above and indicated at 147 and 148, FIG. 9, and is a scrap elevation view of the load cell mounting arrangements as seen with the frame member corresponding to the frame member 120 (FIG. 9) removed. Thus the frame member 180 shown in FIG. 12 corresponds to the inwardly facing wall of frame member 119 (FIG. 9), the mounting plate 181 corresponds to a mounting plate such as 129 (FIG. 9) while the frame member 182 corresponds to a chassis cross member such as 121 (FIG. 9). The load cell tether, comprises a load cell indicated at 184, together with stay rods 185 and 188, the load cell 184 being located within the hollow rectangular section of the cross-members 182, the vertical walls of which are slotted to accept the stay rods. The load cell is available as a proprietory component but generally comprises a simple cylinder having a suitable modulus of elasticity. To the inside surface of the load cell are secured resistive strain gauge measuring elements so as to lie parallel with the cylinder axis. End caps 186 and 187 formed integral with the stay rods 185 are screwed into the ends of the load cell cylinder. The stay rod 188 is terminated in a circular eye piece which is located between a pair of lugs, only the near side lug 183 is visible in FIG. 12. The two lugs are welded to the rear facing wall of the cross member 182, and an eye bolt, not shown, passes through the lugs and the intervening stay rod eye to secure the cable engine end of the stay. The stay rod 185 which forms the cable ship end of the stay is located in a grease packed bearing 190 carried by a welded supporting bracket 189 which is bolted to supporting stool 193 which, in turn, is bolted to the deck structure. The outer end of the stay rod 185 is threaded to accept the tensioning nuts 191 and 192, by means of which the stay can be stressed to a specified, predetermined amount, as indicated by the strain gauge associated with the load cell. The operation of the load cell tethers will now be explained by means of a specific example.

In a particular case where the maximum cable tension that can be tolerated is 10 tons, then the tethering stress applied to each end of the cable engine would be pre-set to 7.5 tons. Now, if during the laying or recovery of a submarine cable, the tension in the cable at the point where it leaves or enters the cable engine, i.e. at the outboard end thereof, is, say, 4 tons, then the stress in the tether at the outboard end of the cable engine will fall to 6.5 tons, while the stress in the tether at the inboard end will rise to 9.5 tons, the cable tension at the inboard end of the cable engine being zero. By adding the strain gauge indication from the load cells, algebraically an indication of the cable tension is obtained and this may be displayed continuously by suitable instrumentation incorporated within a separate control console. Suitable resistive strain gauge elements are available as proprietory articles and the associated electrical or electronic circuit means required to enable the required stress indications to be provided can readily be devised by those skilled in the art. These elements are therefore not described in detail in this Specification. Also to counter the fluctuations in the cable stress readings obtained due to the pitching action of the cable ship at sea, a further strain gauge may be provided in association with a pendulum means attached to a bulkhead of the ship and the output from this strain gauge connected in opposition to the output from the load cell strain gauges, so that a steady reading of cable tension is always provided. It will be appreciated from the above description that, so long as the maximum cable tension remains within the tolerated limit, the stresses applied at each end of the cable engine are always in balance and consequently any longitudinal movement of the cable engine will be very small and not more than a few thousandths of an inch.

Figure 1:
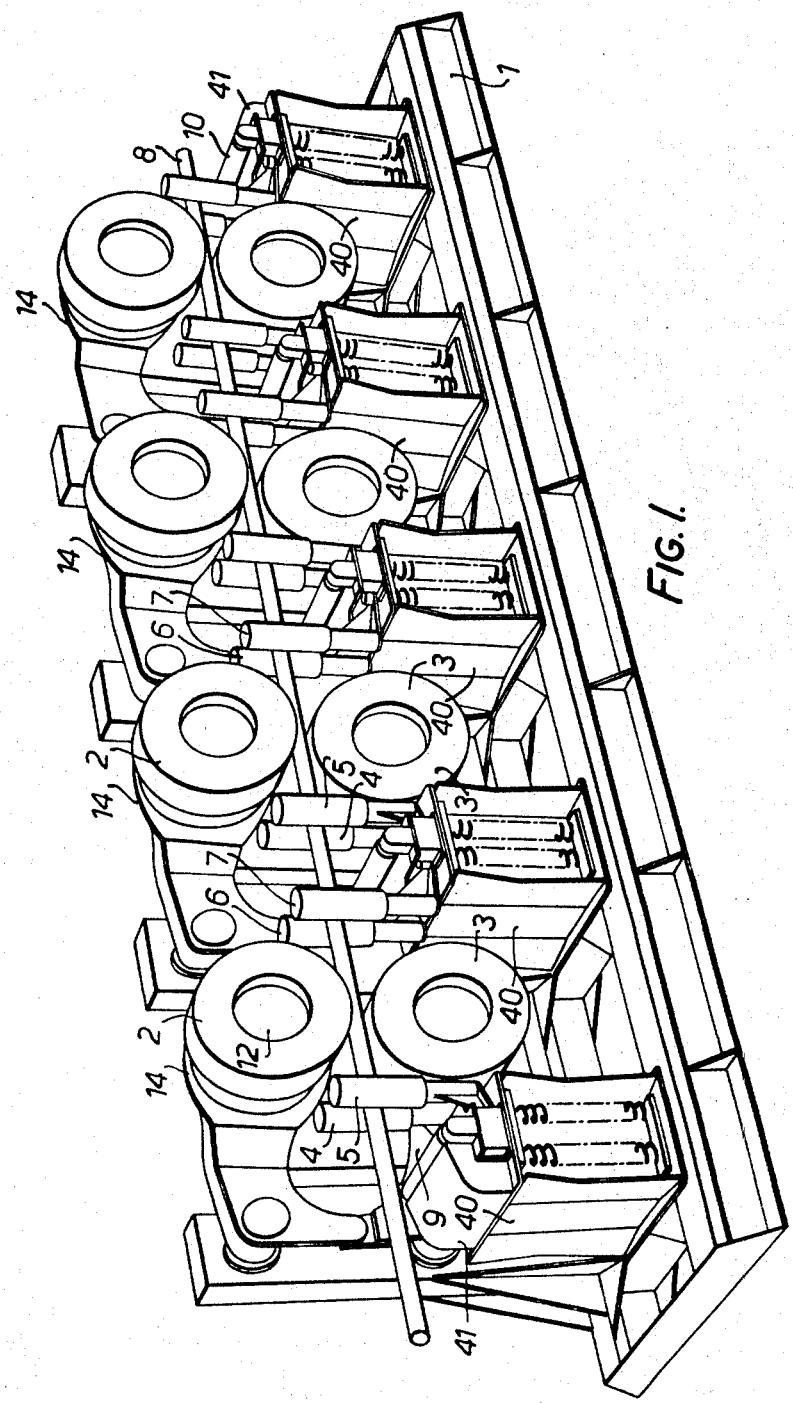

Referring again to FIG. 1, it will be appreciated that for a multi-modular assembly as described above with reference to FIG. 9 of the drawings, guide roller pedestals incorporating a glide path 41 (FIG. 1) are not provided and each module comprises a number of pairs of traction wheels with each of which pedestals comprising guide rollers only are associated. Thus in FIG. 1, the cable engine module there shown, when designed as part of a multi-modular assembly as in FIG. 9, would have the glide path pedestal at the left-hand end of the cable engine module modified to be of the same form as the intervening guide roller pedestals, while the glide path pedestal at the right-hand end of the cable engine of FIG. 1 is not provided. With the cable engine assembly shown in FIG. 9 a glide path pedestal (not shown) may be provided separate from the cable engine and located near the inboard end thereof.

Again, referring to FIG. 1, it has been found desirable to arrange that in the laying or recovery of a cable, the moment of the force between the traction wheels of a pair and the cable sheath, with respect to the respective bell crank lever pivots, should be in a direction such that the traction wheels of the pair are urged inwardly towards the cable path axis. Consideration of FIG. 1 will show that if the cable engine of FIG. 1 is employed for submarine cable laying or recovery and is installed with its left-hand end directed towards the bow sheave, so that cable is either fed from right to left of the engine, or is hauled from left to right, the above requirement is met but would not be met if the cable engine were used in the reverse sense, i.e. in cooperation with the stern laying sheaves of the cable ship. However, the direction of the cable engine can be changed by, in effect, rotating each pair of traction wheels through 180°. This involves dismantling the traction wheels with their associated bell crank levers and reassembling the engine so that the traction wheel which was previously the lower one of a pair, now becomes the upper one of the pair and vice versa. In carrying out this reassembly it is also necessary to reposition the guide roller pedestals to centralize the guide rollers with respect to the reversed traction wheels, and it is to enable this to be done, that the pedestal mounting plates such as 129 (FIG. 9) are provided with two set of pedestal mounting bolt holes as previously described.

It will be appreciated that the cable engine just described is very versatile and can be arranged to fulfil the requirements of hold-back or draw-off gear for general cable laying on land or sea. The cable engine described is particularly suited to submarine repeatered cable laying or recovery. For example it is contemplated that such a cable engine could be mounted across thwartship rails so that its center line can be either over the cable drum for use as a draw-off or hold-back gear or, over the bow sheave center line for use as a repeatered cable laying gear. Conversely, a number of cable engines in tandem may be used for laying repeatered cable over the stern sheaves. While this cable engine can be used for the laying or recovery of any type of cable, it is particularly suited to the laying or recovery of relatively fragile non-armored plastic insulated cable since the wide spacing of the traction wheel pairs together with the use of a number of pairs of traction wheels in tandem enables the stress applied to the cable during laying or recovery operations to be spread over a substantial length of the cable whereby the stress gradient at any point in the cable in its passage through the cable engine is low relative to the maximum stress to which the cable may be subjected (typically of the order of 10 tons).

FIGS. 14 and 15 illustrate a second embodiment of the cable engine according to the invention. This second embodiment differs from the first embodiment described above, mainly, in that the guide roller assemblies employed in the first embodiment are replaced in the second embodiment by further pairs of traction wheels which are disposed horizontally so that the cable engine according to the second embodiment comprises pairs of vertical and pairs of horizontal traction wheels with the respective pairs arranged in interspaced relationship to one another. This arrangement thus provides a more compact assembly which is particularly suited to cable ship installation where space is limited and where the cable stresses involved are less liable to cause damage to the cable structure, for example, in the laying or recovery of robust armored cable. FIG. 14 shows, in outline form only, a plan view of one end of a cable engine module according to this second embodiment and illustrates the general arrangement of the horizontal and vertical traction wheels. FIG. 15 shows in more detail a sectional view taken on the line A—A in FIG. 14, and with the sectioned pair of horizontal driving wheels removed for clarity.

Figure 8:
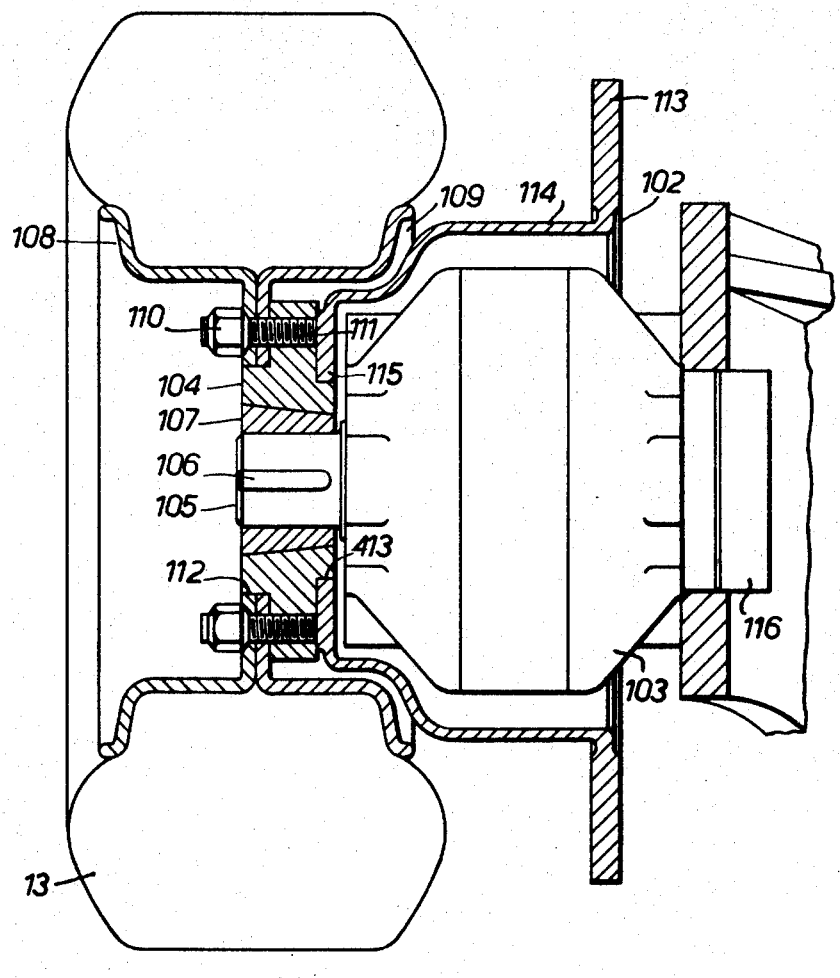

Referring to FIG. 14 a cable engine according to this embodiment is constructed of one or more modules each comprising seven pairs of traction wheels, and cable entry and exit gates located respectively, one at each end of the module. The seven pairs of traction wheels are arranged to provide four horizontal pairs and three vertical pairs, each vertical pair being located between two horizontal pairs, this arrangement being chosen to minimize the number of vertical support members required and hence the overall weight of the engine. Of the seven pairs of traction wheels comprising a module, FIG. 14 shows only two horizontal pairs comprising the traction wheels 201, 202, and 203, 204, separated by one vertical pair of which only the upper traction wheel 205 is seen in the drawing of FIG. 14, the lower traction wheel 206 of this pair being shown in FIG. 15 of the drawing, described below, Subsequent pairs of vertical and horizontal traction wheels are of identical structure and arrangement to those shown. As in the first embodiment described above, the traction wheels are individually driven by hydraulic motors and are provided with pneumatic types and disc brakes as described above with reference to FIG. 8 of the drawings, the disc brake calipers being omitted from FIG. 14 for clarity. Also, as in the first embodiment, each of the traction wheels is carried at the free end of the lever arm such as the lever arms 207, 208, 209, 210 and 211 each of which is pivoted in a hub member such as 212. The lever arms all have the same general construction and comprise a flat plate like member 213 with a rearwardly projecting strengthening flange 214, these being welded together and to the hub member 212, the construction being similar to that described above with reference to FIG. 3 of the drawings. The traction wheels of each pair are also linked by linking lever members similar to the lever members 23 and 24 described above with reference to FIG. 3 of the drawings and with hydraulic ram members but for clarity there are omitted from FIG. 14, but are described below with reference to FIG. 15 of the drawings. Also shown in FIG. 14 is a cable entry gate which comprises a cable sheave 215 which is carried by pivoted lever members 216 and 217. These levers are of bell crank form, the free limbs (not shown) being connected to helical spring members 218, 219 secured to fixed plate members 220, 221, whereby the sheave is urged into contact with a cable being fed to or from the module. The gate also comprises a pair of vertical roller members, indicated at 222 and 223 which serve to limit lateral movement of the cable.

Referring now also to FIG. 15 of the drawings, the cable engine module according to this second embodiment is mounted upon a chassis which comprises three longitudinal frame members 224, 225 and 226 each of which is of rectangular hollow section as shown in FIG. 15. The lower frame members 225 and 226 are bridged by end plates and by cross members (not shown) to provide a rigid base structure, while the upper frame member 224 is supported by two fabricated stanchion structures each of which comprises two laterally extending vertical side plates 227 and 228 (FIG. 14) which are secured in spaced relationship to one another by strengthening webs 232 and 233 (FIG. 15). The upper end of each stanchion is formed to provide a supporting bracket for the upper frame member 224, while the lower ends of the stanchion is recessed to accommodate a bottom supporting plate as well as the lower frame member 225 and the structure is secured by welding. Also, the inwardly facing edges of the stanchion side members 227 and 228 are formed with wing parts 229 (FIG. 15) which project inwardly over the upper surface of the lower frame member 225, and between which two horizontal support members are welded and of which only the support member 230 (FIG. 15) is visible. These support members serve to carry the bush housing about which the driving wheel 204 is pivoted, as described in more detail below. The two fabricated stanchion members are spaced lengthwise of the upper frame member 224 so as to provide support at points intermediate the pivots about which the upper ones of the three vertical pairs of traction wheels are pivoted.

The pivots about which the lever arms, associated with the respective traction wheels, are displaced, are all of the same construction and consequently, only the pivot for the upper lever arm 209 will be described in detail. Thus the lever arm 209 together with its supporting web 214 and a hub part 212 are welded together to form an integral unit. A pivot pin (not shown) is secured within the hub part 212 and is journalled in a bearing member 234 which is carried by the upper frame member 224 and through which the end of the pivot pin projects, the projecting end part of the pivot pin being secured to one end of a linking lever arm 235, the assembly being retained by an end cap 236 and clamping nut 237 which co-operates with a threaded extension of the pivot pin. With this arrangement, displacement of the traction wheel lever arm 209 is communicated to the linking lever arm 235. The lever arm 242 associated with the lower traction wheel 206 of this vertical pair, is similarly coupled to a linking lever arm 243.

Figure 3:
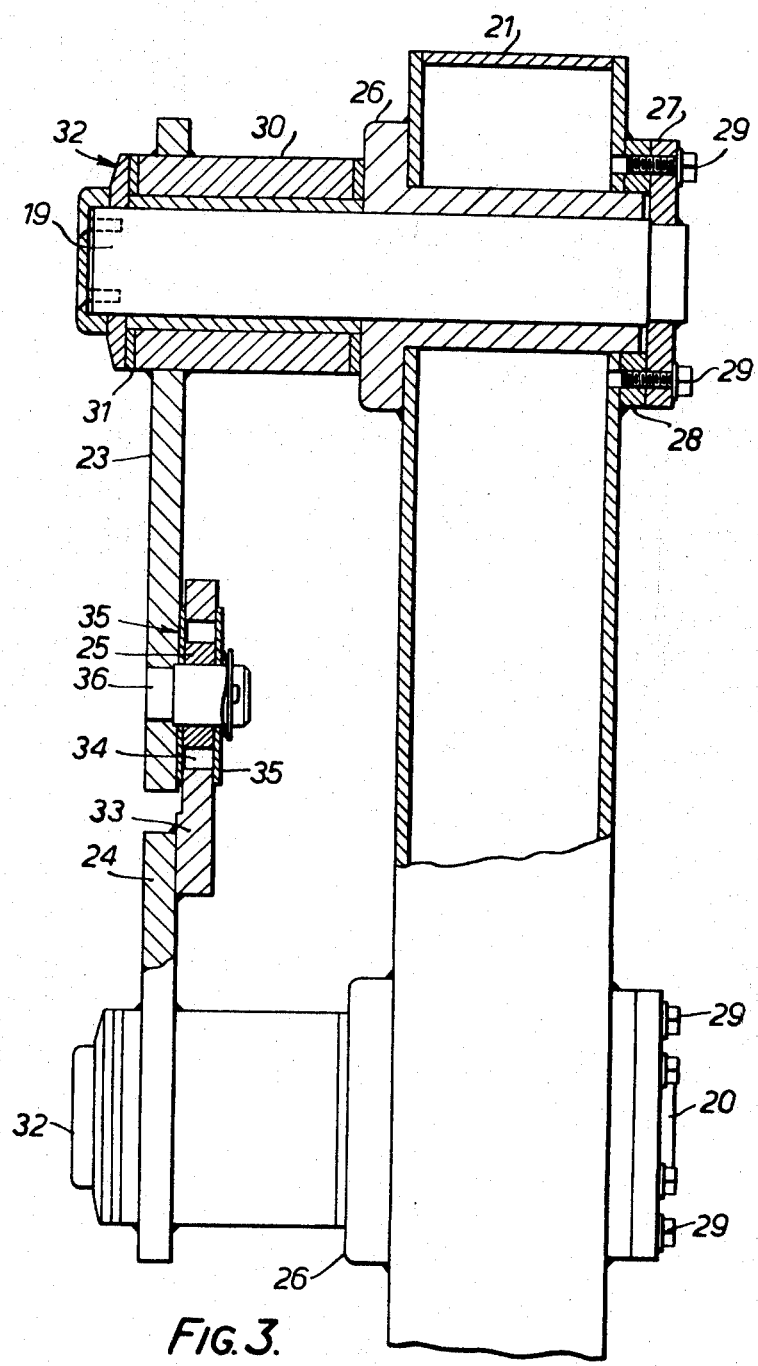
Figure 4:
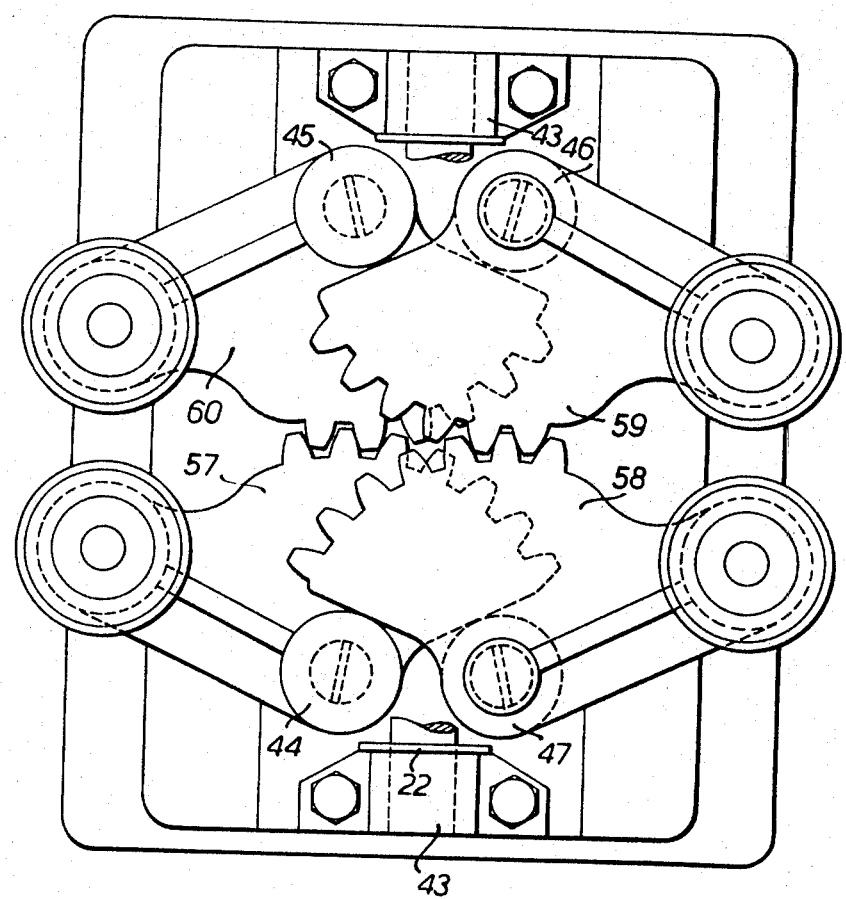
Figure 5:
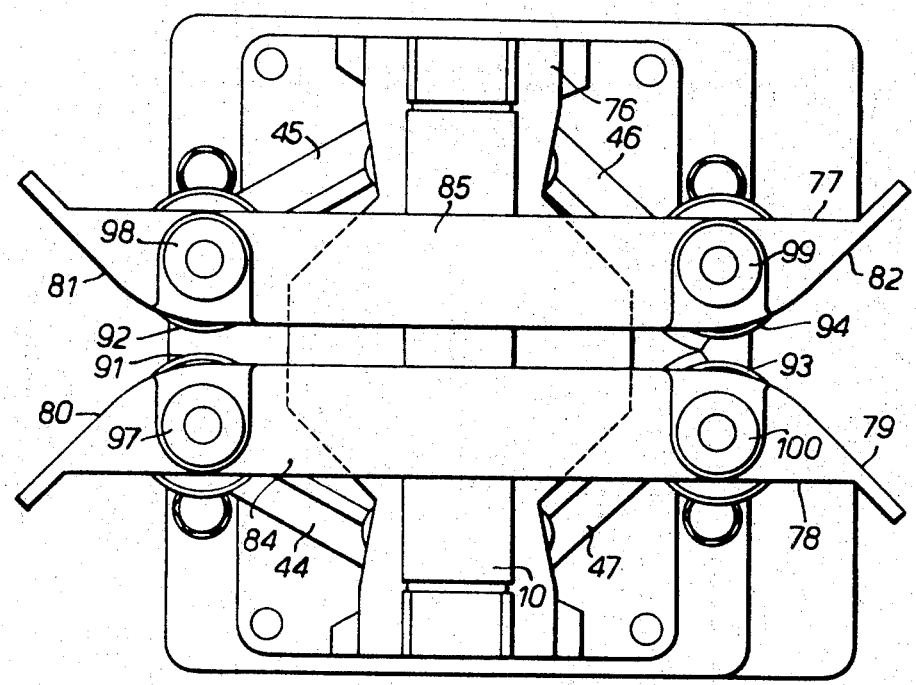
Figure 6:
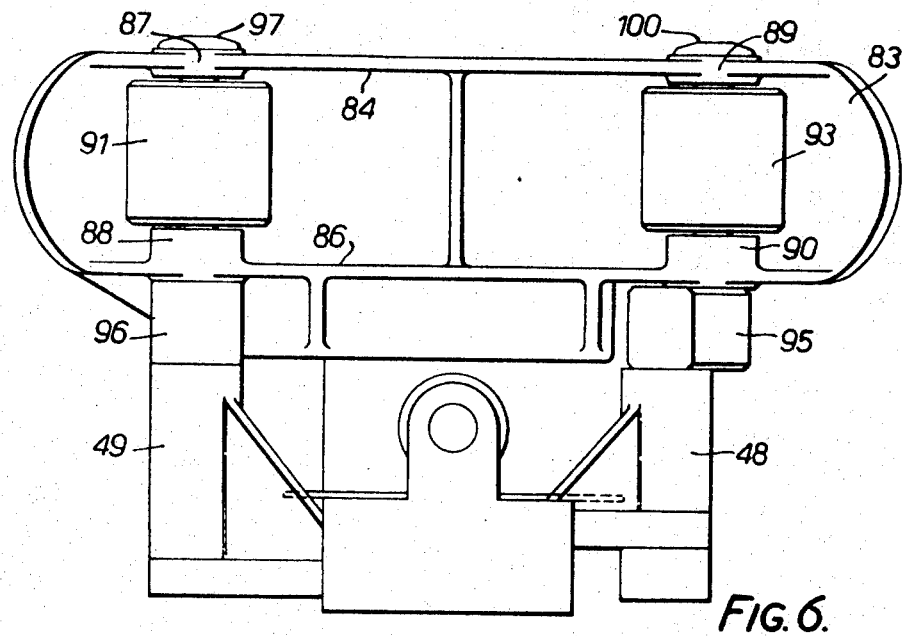
Figure 7:
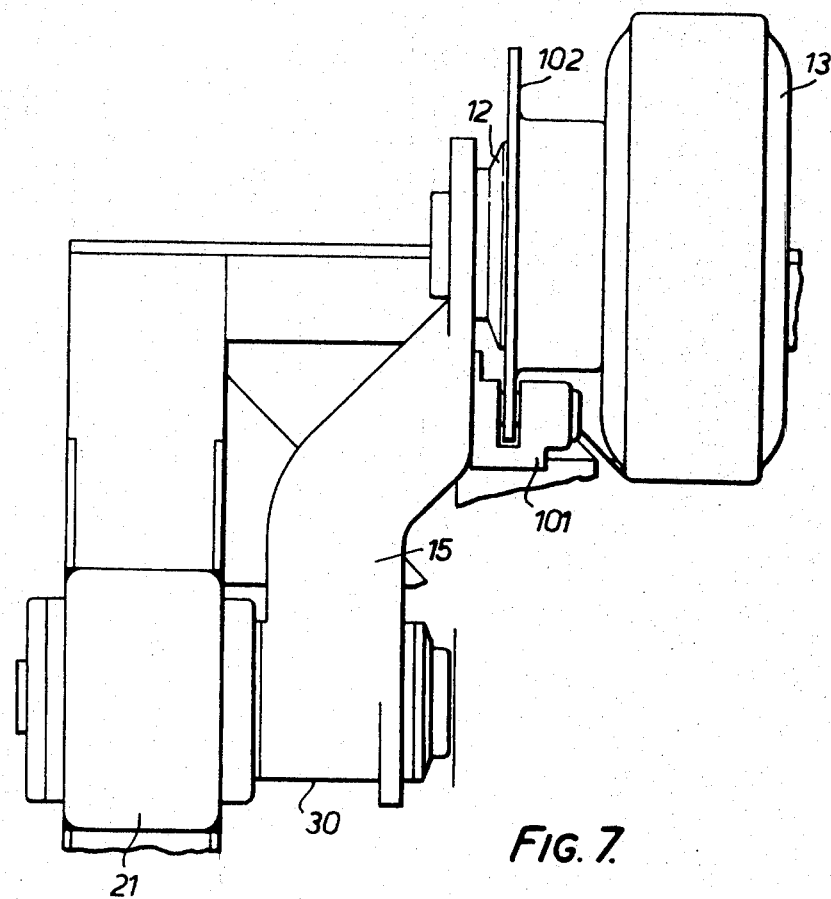

The function of the linking lever arms 235 and 243 and the manner in which they are coupled together by the pivot 244, is exactly the same as described with regard to the lever arms 23 and 24 of the first embodiment and with reference to FIG. 3 of the drawings. It will be noted that in the case of this second embodiment the linking lever arms 235 and 243 are located at the rear of their respective bearing members so as to be out of the way of the horizontal traction wheels. As shown in FIG. 15, the bearing member 247 associated with the lower traction wheel lever arm 242 is carried by two supporting webs 245 and 246 (FIG. 5) which are welded to and project upwardly from the lower frame member 225 so that the bearing members 234 and 247 are in vertical alignment with one another.

The vertical pair of lever arms 209 and 242 are linked together by an hydraulic ram 248, the ram shaft 241 being formed with a bifurcated end which is secured to a lug 240 (shown dotted in FIG. 15) which depends from the strengthening web 214 of the lever arm 209, by a pivot pin 242, while the cylinder head end 249 shown in ghost only in FIG. 15 of the ram is similarly secured to the strengthening web part of the lever arm 242. As previously described in connection with the first embodiment, the ram is caused to exert a pull upon the associated lever arms so as to urge the traction wheels of the pair inwards towards the cable path axis.

The lever arms 210 and 211 which carry respective ones of the horizontal traction wheels 203 and 204, are pivoted in pivot bushings 253 and 254 and are provided with linking lever arms 255 and 256 in exactly the same way as for the vertical traction wheel assembly described above, the horizontal linking lever arms 255 and 256 extending beneath and clear of, the lower vertical traction wheel 206. Also, as in the case of the vertical traction wheel assembly, a horizontally acting hydraulic ram 257, shown partly in ghost in FIG. 15, is coupled to the lever members 211 and 210 in the same way as is described above with reference to the vertical ram 248.

The horizontal ram 257 could be located in a position different to that shown. The ram could be coupled to the pin linking the lever arms 255 and 256, the ram extending longitudinally of the chassis. Such an arrangement would have the advantage of being immune to damage from such hazards as a swinging shackle or debris hauled aboard with the cable.

The bearing members 253 and 254 are carried by horizontally projecting supporting plates, the support plates 251 and 252 being associated with the bearing member 254 and being welded to side plates 250 and 255 (FIG. 14) which, in turn, are welded to the upper surface of the lower frame member 226. Strengthening webs, of triangular form, not shown in FIG. 15, may also be welded to these side plates and to the lower frame member. The bearing member 253, associated with the horizontal lever arm 210 and its associated horizontal traction wheel 204, is partly obscured in FIG. 15, by the vertical bearing member 247, but is carried in a similar manner to the bearing member 254, the side plates, corresponding to the side plates 250 and 255, being formed by the wing parts 229 of the stanchion side members, as previously described.

Figure 16:
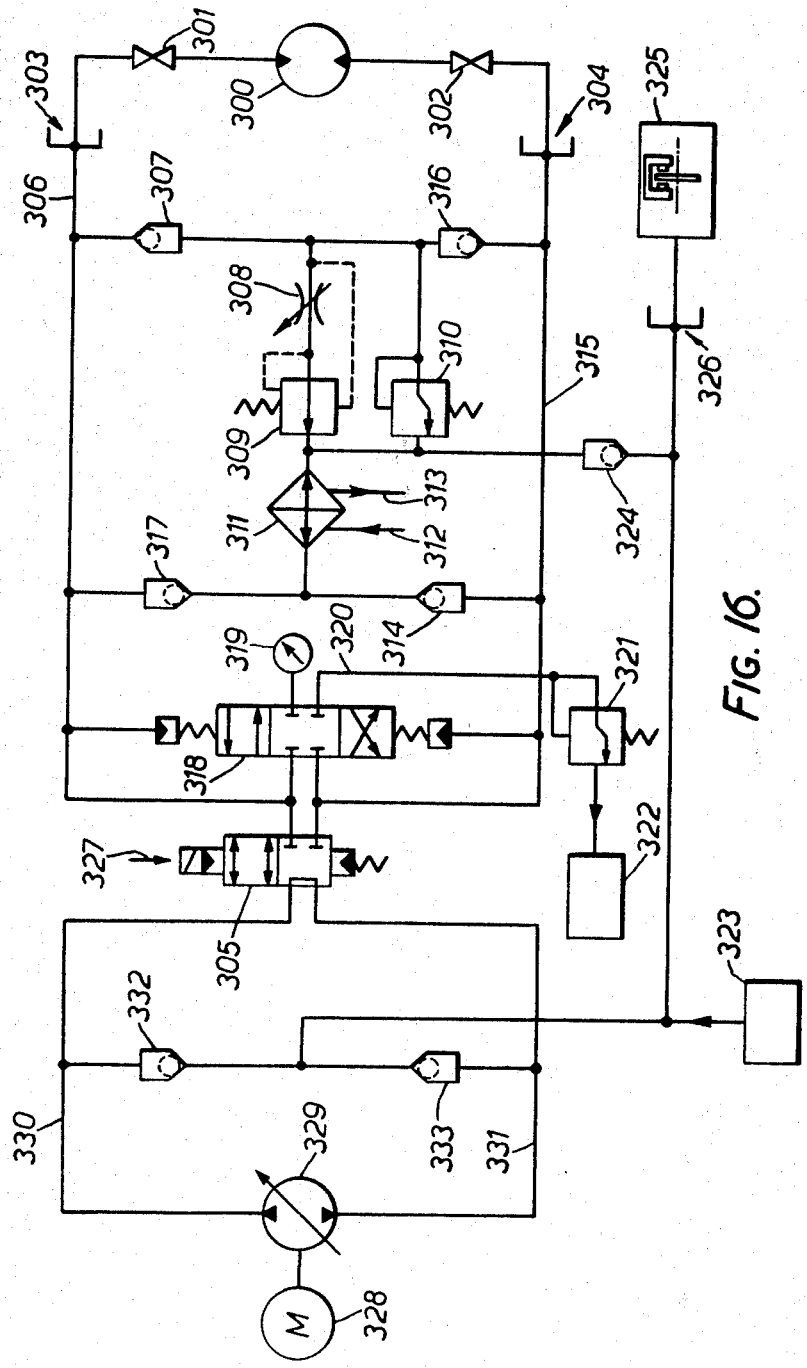

FIGS. 16 and 17 show an hydraulic system applicable to either of the two embodiments just described. In FIG. 16 reference 300 represents an hydraulic motor/pump unit connected to a respective traction wheel. The motor/pump unit 300 is connected into the hydraulic system by isolating valves 301, 302 which allow disconnection of the motor/pump unit 300 from the system when necessary. The motor/pump units for the other traction wheels are connected in the system similarly in parallel with motor/pump unit 300 as indicated by references 303, 304.

When a cable is being recovered the motor/pump units are employed as motors and conversely employed as pumps for laying a cable. A haul/lay valve 305 controls the selection of the recovering or laying mode of operation, as shown it is in the cable laying position. When a cable is being laid, the motor/pump units pump hydraulic fluid around one of two paths, depending on the direction of rotation of the motor/pump units. Thus hydraulic fluid circulates through line 306, non-return valve 307, throttle control 308, valve 309, heat exchanger 311, non-return valve 314 and line 315 back to the motor/pump units for one direction of rotation. For the other direction of rotation the path is line 315, non-return valve 316, components 308, 309, 311, non-return valve 317 and line 306. The throttle control 308 and valve 309 present a resistance to the circulation of hydraulic fluid and so control the braking force applied to the cable being laid. The throttle control 308 is adjusted to provide the desired degree of braking and valve 309 is a pressure compensating valve to maintain the degree of braking substantially independent of pressure variations in the system. A relief valve 310 is connected in parallel with the throttle control 308 and valve 309. The relief valve 310 is pre-set to a pressure value corresponding to the maximum allowable tractive force. If the pressure in the system tends to rise beyond this pre-set value valve 310 opens and bypasses hydraulic fluid to the heat exchanger. It will be appreciated that this arrangement serves to prevent damage to the cable due to the application of excess tension. Heat generated in the hydraulic fluid is removed by the heat exchanger 311, coolant entering and leaving by paths 312 and 313 respectively.

A pressure sensing valve is shown as reference 318 and is actuated by the hydraulic pressure difference between lines 306 and 315. The valve 318 is illustrated in a non-actuated position but during use connects the high pressure side of the system to a pressure gauge 319 and the low pressure side via a pressure relief valve 321 to an hydraulic fluid reservoir tank 322. Fluid removed from the circulatory path by valve 310 is replaced from a boost supply 323 via a non-return valve 324. Whether line 306 or line 315 is at high pressure will depend on the direction of rotation of the motor/pump units.

The boost supply 323 also supplies the disc brakes such as reference 325. The disc brakes are connected in parallel as indicated by reference 326. In some systems it may be desirable to use a pressure reducing valve to supply the disc brakes. The boost supply removes the brake calipers from the discs as has already been explained.

Operation of the hydraulic system in the recovery mode involves the use of the components illustrated on the left of the diagram. The haul/lay valve 305 is put into its lower position (as indicated by the arrow 327) for operation of the motor/pump units as motors.

A prime mover 328 operates a variable output hydraulic pump 329 having its output connected to lines 330 and 331. Lines 330 and 331 are connected through haul/lay valve 305 to the hydraulic motor/pump units via lines 306 and 315 respectively. The boost supply 323 is connected via non-return valves 332 and 333 respectively to lines 330 and 331. This arrangement prevents cavitation occurring in the pump 329.

It will be apparent that adjustment of the pump 329 and control of the throttle control 308 will enable the hauling traction applied to the cable to be controlled. Reversal of the pumping direction of pump 329 will reverse the direction of rotation of the motor/pump units.

FIG. 17 shows the hydraulic system employed for operating the hydraulic rams. Reference 334 diagrammatically illustrates one such hydraulic ram. As previously explained the rams are double-acting, lines 335 and 336 providing hydraulic fluid inputs on respective sides of the piston of the ram 334. A changeover switch 337 controls the supply of hydraulic fluid to the ram so as to bias the traction wheels towards or away from the cable as desired. An accumulator 338 is connected to the high pressure supply to the switch 337. The low pressure connection to switch 337 is connected via line 343 to an hydraulic fluid reservoir tank 344. An excess pressure relief valve 342 (which is preset to a value corresponding to the maximum allowable inward force to be applied by the traction wheels to the cable) is connected from the high pressure line to the tank 344. A high pressure supply 339 (in a typical application 2000 pounds per square inch) is connected to the accumulator 338 by way of a non-return valve 340. Each ram is associated with a respective accumulator, non-return valve, changeover switch and relief valve in a similar manner. The rams are connected in parallel as indicated by reference 341.

It will also be appreciated that although the invention has been described in terms of a specific embodiment other forms and modifications are possible within the scope of the invention. For example, the guide rollers and traction wheels may be mounted on separate base plates or two or more cable engines may be used in tandem. Any desired number or arrangement of guide rollers and traction wheels may be adopted to suit a particular purpose. Instead of diametrically opposed pairs of traction wheels, one wheel could be opposed, for example, by a pair of traction wheels or alternatively a pair of free wheels.

We claim:

1. Apparatus for the laying or recovery of cables, the apparatus including:
   a first plurality of pairs of guide means, and
   a second plurality of pairs of guide means, said pairs of guide means being mounted in tandem fashion on mounting means and co-operating to define a cable path, wherein:
   the first plurality of pairs of guide means comprises pairs of traction wheels fitted with pneumatic tires,
   means are provided to operate the traction wheels to apply traction to a cable,
   individual means for each pair of traction wheels are provided to resiliently bias the wheels of the pair into contact with the cable at opposite ends of a diameter thereof and to constrain said wheels for substantially symmetrical movement about the cable path, said individual means comprising individual hydraulic rams, each ram being associated with a hydraulic fluid pressure relief valve to limit the force which can be applied to the cable surface, individual means for each pair of guide means of said second plurality of guide means are provided to resiliently bias the guide means of the pair inwardly towards the cable path and to constrain said guide means for substantially symmetrical movement about the cable path.

2. Apparatus for the laying or recovery of cables, the apparatus including:

a first plurality of pairs of guide means, and a second plurality of pairs of guide means, said pairs of guide means being mounted in tandem fashion on mounting means and co-operating to define a cable path, wherein:

the first plurality of pairs of guide means comprises pairs of traction wheels fitted with pneumatic tires, means are provided to operate the traction wheels to apply traction to a cable, individual means for each pair of traction wheels are provided to resiliently bias the wheels of the pair into contact with the cable at opposite ends of a diameter thereof and to constrain said wheels for substantially symmetrical movement about the cable path, said individual means comprising individual hydraulic rams, individual means for each pair of guide means of said second plurality of guide means are provided to resiliently bias the guide means of the pair inwardly towards the cable path and to constrain said guide means for substantially symmetrical movement about the cable path.

3. Apparatus for the laying or recovery of cables, the apparatus including:

a first plurality of pairs of guide means, and a second plurality of pairs of guide means, said pairs of guide means being mounted in tandem fashion on mounting means and co-operating to define a cable path, wherein:

the first plurality of pairs of guide means comprises pairs of traction wheels fitted with pneumatic tires, means are provided to operate the traction wheels to apply traction to a cable, individual means for each pair of traction wheels are provided to resiliently bias the wheels of the pair into contact with the cable at opposite ends of a diameter thereof and to constrain said wheels for substantially symmetrical movement about the cable path, said individual means comprising mechanically-coupled belt-crank lever mountings, individual means for each pair of guide means of said second plurality of guide means are provided to resiliently bias the guide means of the pair inwardly towards the cable path and to constrain said guide means for substantially symmetrical movement about the cable path.

4. Apparatus for the laying or recovery of cables, the apparatus including:

a first plurality of pairs of guide means, and a second plurality of pairs of guide means, said pairs of guide means being mounted in tandem fashion on mounting means and co-operating to define a cable path, wherein:

the first plurality of pairs of guide means comprises pairs of traction wheels fitted with pneumatic tires, means are provided to operate the traction wheels to apply traction to a cable, individual means for each pair of traction wheels are provided to resiliently bias the wheels of the pair into contact with the cable at opposite ends of a diameter thereof and to constrain said wheels for substantially symmetrical movement about the cable path, and individual means for each pair of guide means of said second plurality of guide means are provided to resiliently bias the guide means of the pair inwardly towards the cable path and to constrain said guide means for substantially symmetrical movement about the cable path, said last mentioned individual means comprising spring means and pivoted lever mounting members linked by quadrant gearing.

5. Apparatus for the laying or recovery of cables, the apparatus including:

a first plurality of pairs of guide means, and a second plurality of pairs of guide means, said pairs of guide means being mounted in tandem fashion on mounting means and co-operating to define a cable path, wherein:

the first plurality of pairs of guide means comprises pairs of traction wheels fitted with pneumatic tires, means are provided to operate the traction wheels to apply traction to a cable, a plurality of resilient wheel bias means, each wheel bias means being connected to a respective pair of traction wheels to resiliently bias the wheels of the pair into contact with the cable at opposite ends of a diameter thereof, a plurality of wheel constraining means, each wheel constraining means being connected to a respective pair of traction wheels to constrain the wheels of the pair for substantially symmetrical movement towards and away from the cable path, a plurality of resilient guide bias means, each guide bias means being connected to a respective pair of guide means to resiliently bias the guide means of the pair inwardly towards the cable path, and a plurality of guide constraining means, each guide constraining means being connected to a respective pair of guide means to constrain the guide means of the pair for substantially symmetrical movement towards and away from the cable path.

6. Apparatus as claimed in claim 5 further characterized in that the traction wheels are provided with disc brakes.

7. Apparatus as claimed in claim 5 further characterized in that means are provided to monitor the tension in a cable being laid or recovered.

8. Apparatus as claimed in claim 5 wherein the second plurality of pairs of guide means also comprises pairs of traction wheels fitted with pneumatic tires, the axes of the traction wheels of said second plurality being arranged substantially orthogonal to the axes of the first mentioned traction wheels.

9. Apparatus as claimed in claim 8 further characterized in that the traction wheels are provided with disc brakes.

10. Apparatus as claimed in claim 5 wherein the second plurality of pairs of guide means comprises pairs of skid members.

11. Apparatus as claimed in claim 5 wherein said means to operate the traction wheels comprises individual hydraulic motor/pump units.

12. Apparatus as claimed in claim 11 further characterized by the provision of an hydraulic system including a throttle control such that, in use, when the hydraulic motor/pump units are operated as pumps, the throttle control presents an adjustable resistance to the flow of hydraulic fluid from the said motor/pump units so as to cause the application of an adjustable braking traction to a cable being laid.

13. Apparatus as claimed in claim 12, further characterized by the provision of an hydraulic fluid pressure relief valve to limit the braking traction which can be applied to a cable.

* * * * *